US005436757A

United States Patent [19]
Okazaki et al.

[11] Patent Number: 5,436,757
[45] Date of Patent: Jul. 25, 1995

[54] OPTICAL WAVELENGTH CONVERTING APPARATUS

[75] Inventors: Yoji Okazaki; Hiroaki Hyuga; Akinori Harada, all of Kanagawa, Japan

[73] Assignee: Fuji Photo Film Co., Ltd., Kanagawa, Japan

[21] Appl. No.: 40,201

[22] Filed: Apr. 1, 1993

[30] Foreign Application Priority Data

Apr. 3, 1992 [JP] Japan .................................. 4-081984
Feb. 9, 1993 [JP] Japan .................................. 5-021153

[51] Int. Cl.$^6$ .................................................. G02F 1/37
[52] U.S. Cl. .................................. 359/332; 359/328; 385/122
[58] Field of Search ............................ 359/326-332; 385/122; 372/21, 22

[56] References Cited

U.S. PATENT DOCUMENTS

| | | | |
|---|---|---|---|
| 5,022,729 | 6/1991 | Tamada et al. | 359/328 |
| 5,036,220 | 7/1991 | Byer et al. | 359/328 |
| 5,113,469 | 5/1992 | Hatakoshi et al. | 385/122 |
| 5,144,636 | 9/1992 | Yoshida et al. | 359/332 X |
| 5,157,754 | 10/1992 | Bierlein et al. | 385/122 |
| 5,170,460 | 12/1992 | Arvidsson et al. | 385/122 X |
| 5,253,102 | 10/1993 | Okazaki | 359/328 |

OTHER PUBLICATIONS

"Interactions Between Light Waves in a Nonlinear Dielectric", *Physical Review*, J. A. Armstrong et al, vol. 127, No. 6, Sep. 15, 1962, pp. 1918-1939.

*Primary Examiner*—John D. Lee
*Attorney, Agent, or Firm*—Sughrue, Mion, Zinn, Macpeak & Seas

[57] ABSTRACT

An optical wavelength converting apparatus comprises a fundamental wave source, which produces a laser beam serving as a fundamental wave, and an optical wavelength converting device, which is provided with an optical waveguide constituted of a nonlinear optical material. The optical wavelength converting device converts a wavelength of the laser beam impinging upon and guided through the optical waveguide. The optical waveguide is provided with a plurality of periodic domain-inverted structures, which effect phase matching between the laser beam and wavelength-converted waves. Reflection of the fundamental wave or wavelength-converted waves from end faces of the optical wavelength converting device is thereby minimized, and a plurality of wavelength-converted waves having high intensities are obtained in a state combined with one another.

14 Claims, 4 Drawing Sheets

OPTICAL WAVELENGTH CONVERTING APPARATUS

BACKGROUND OF THE INVENTION

1. Field of the Invention

This invention relates to an optical wavelength converting apparatus for converting a fundamental wave into its second harmonic, or the like. This invention particularly relates to an optical wavelength converting apparatus, wherein a plurality of wavelength-converted waves having different wavelengths are obtained.

2. Description of the Prior Art

Various attempts have heretofore been made to convert the fundamental wave of a laser beam into its second harmonic, or the like, e.g. to shorten the wavelength of a laser beam, by using a nonlinear optical material. As optical wavelength converting devices for carrying out such wavelength conversion, there have heretofore been known a bulk crystal type of optical wavelength converting device, an optical waveguide type of optical wavelength converting device, and the like.

In cases where the wavelength of a laser beam is shortened in the manner described above, such that a plurality of wavelength-converted waves having different wavelengths may be obtained in a state combined with one another, a fundamental wave produced by a single light source or fundamental waves produced by a plurality of light sources impinge upon one of a plurality of independent optical wavelength converting devices and then impinge upon another optical wavelength converting device. Specifically, for example, when a single fundamental impinges upon one of two independent optical wavelength converting devices and then upon the other optical wavelength converting device, the second harmonic of the fundamental wave can be generated in the first optical wavelength converting device, and the third harmonic of the fundamental wave can be generated in the second optical wavelength converting device. Also, when first and second fundamental waves, which are in the state combined with each other, impinge upon one of two independent optical wavelength converting devices and then impinge upon the other optical wavelength converting device, the second harmonic of the first fundamental wave can be generated in the first optical wavelength converting device, and the second harmonic of the second fundamental wave can be generated in the second optical wavelength converting device.

However, in cases where a fundamental wave or fundamental waves impinge upon one of a plurality of independent optical wavelength converting devices and then impinge upon another optical wavelength converting device in the manner described above, the fundamental wave or fundamental waves are reflected many times by end faces of the devices. Also, often when a wavelength-converted wave whose wavelength has been converted by a certain optical wavelength converting device impinges upon a different optical wavelength converting device, the wavelength-converted wave is reflected by an end face of the different optical wavelength converting device. Therefore, it is not always possible to obtain a wavelength-converted wave having a high intensity.

SUMMARY OF THE INVENTION

The primary object of the present invention is to provide an optical wavelength converting apparatus, wherein reflection of a fundamental wave or wavelength-converted waves from end faces of an optical wavelength converting device is minimized, and a plurality of wavelength-converted waves having high intensities are thereby obtained in a state combined with one another.

Another object of the present invention is to provide an optical wavelength converting apparatus, which is suitable for use in a color image recording apparatus.

The present invention provides a first optical wavelength converting apparatus comprising:
  i) a fundamental wave source, which produces a laser beam serving as a fundamental wave, and
  ii) an optical wavelength converting device, which is provided with an optical waveguide constituted of a nonlinear optical material, and which converts a wavelength of the laser beam impinging upon and guided through the optical waveguide,
    wherein the optical waveguide is provided with a plurality of periodic domain-inverted structures, which effect phase matching between the laser beam and wavelength-converted waves.

The present invention also provides a second optical wavelength converting apparatus comprising:
  i) a fundamental wave source, which produces a laser beam serving as a fundamental wave, and
  ii) an optical wavelength converting device, which is constituted of a bulk crystal of a nonlinear optical material, and which converts a wavelength of the laser beam impinging upon the bulk crystal,
    wherein the bulk crystal is provided with a plurality of periodic domain-inverted structures, which effect phase matching between the laser beam and wavelength-converted waves.

In preferred embodiments of the first and second optical wavelength converting apparatuses in accordance with the present invention, a first fundamental wave source, which produces a first laser beam, and a second fundamental wave source, which produces a second laser beam having a wavelength different from a wavelength of the first laser beam, are provided as the fundamental wave source, and
  the periodic domain-inverted structures comprise a first periodic domain-inverted structure, which effects phase matching between the first laser beam and a second harmonic thereof, a second periodic domain-inverted structure, which effects phase matching between the second laser beam and a second harmonic thereof, and a third periodic domain-inverted structure, which effects phase matching between the first laser beam and the second laser beam and a wave having a frequency equal to the sum of frequencies of the first laser beam and the second laser beam.

In a preferred embodiment of the second optical wavelength converting apparatus in accordance with the present invention, the bulk crystal of the nonlinear optical material constitutes an external resonator, which resonates the laser beam serving as the fundamental wave.

The term "periodic domain-inverted structure" as used herein means a structure in which spontaneous polarization (domain) of a ferroelectric substance having nonlinear optical effects is inverted periodically. A method, wherein a fundamental wave is converted into its second harmonic by using a crystal of a nonlinear optical material having such a periodic domain-inverted structure, has been proposed by Bleombergen, et al. in Phys. Rev., Vol. 127, No. 6, 1918 (1962). With the proposed method, the phase matching between the fundamental wave and its second harmonic can be effected by setting such that a period Λ of domain-inverted regions may be integral multiples of a coherence length Λc, which is represented by the formula $$\Lambda c = 2\pi / \{\beta(2\omega) - 2\beta(\omega)\} \quad (1)$$

wherein $\beta(2\omega)$ represents the propagation constant of the second harmonic, and $2\beta(\omega)$ represents the propagation constant of the fundamental wave.

In cases where wavelength conversion is carried out by using a bulk crystal of a nonlinear optical material provided with no periodic domain-inverted structure, the wavelength at which the phase matching is effected is limited to a specific wavelength inherent to the crystal. However, with the proposed method, the phase matching can be effected efficiently by selecting the period Λ, which satisfies Formula (1), with respect to an arbitrary wavelength.

In cases where a wave having a frequency equal to the sum of the frequencies of first and second fundamental waves is to be generated, the period Λ of domain-inverted regions may be set such that it may be integral multiples of a coherence length Λc, which is represented by the formula $$\Lambda c = 2\pi / [\beta(\omega_3) - \{\beta(\omega_1) + \beta(\omega_2)\}]$$

wherein $\beta(\omega_3)$ represents the propagation constant of the wave having a frequency equal to the sum of the frequencies of the first and second fundamental waves, $\beta(\omega_1)$ represents the propagation constant of the first fundamental wave, and $\beta(\omega_2)$ represents the propagation constant of the second fundamental wave. In this manner, the phase matching can be effected appropriately between the two fundamental waves and the wave having a frequency equal to the sum of the frequencies of the two fundamental waves.

With the first optical wavelength converting apparatus in accordance with the present invention, the optical waveguide is provided with a plurality of the periodic domain-inverted structures. Therefore, a plurality of wavelength-converted waves can be obtained with a single optical waveguide. Specifically, a plurality of the wavelength-converted waves can be obtained by causing a single fundamental wave or a plurality of fundamental waves to impinge only once upon the optical wavelength converting device constituted of the optical waveguide. Therefore, reflection of the fundamental wave or the fundamental waves from the end face of the optical wavelength converting device can be minimized. Accordingly, with the first optical wavelength converting apparatus in accordance with the present invention, the efficiency, with which the wavelength conversion is carried out, can be kept high.

The same effects of minimizing the reflection of the fundamental wave or the fundamental waves can be obtained also with the second optical wavelength converting apparatus in accordance with the present invention, wherein the bulk crystal of the nonlinear optical material is provided with a plurality of the periodic domain-inverted structures. Therefore, with the second optical wavelength converting apparatus in accordance with the present invention, the efficiency, with which the wavelength conversion is carried out, can be kept high.

With the above-described preferred embodiments of the first and second optical wavelength converting apparatuses in accordance with the present invention, three wavelength-converted waves having different wavelengths can be obtained. Therefore, it becomes possible to obtain red light, green light, and blue light. Accordingly, the preferred embodiments of the first and second optical wavelength converting apparatuses in accordance with the present invention are suitable for use in a color image recording apparatus.

With the above-described preferred embodiment of the second optical wavelength converting apparatus in accordance with the present invention, the bulk crystal of the nonlinear optical material constitutes the external resonator, which resonates the fundamental wave. Therefore, the fundamental wave having a particularly high intensity impinges upon the respective periodic domain-inverted structures, and the efficiency, with which the wavelength conversion is carried out, can thereby be kept particularly high.

BRIEF DESCRIPTION OF THE DRAWINGS

FIGS. 6A, 6B, and 6C are explanatory views showing how a bulk crystal type of optical wavelength converting device employed in the fourth embodiment is prepared.

DESCRIPTION OF THE PREFERRED EMBODIMENTS

The present invention will hereinbelow be described in further detail with reference to the accompanying drawings.

Figure 1:
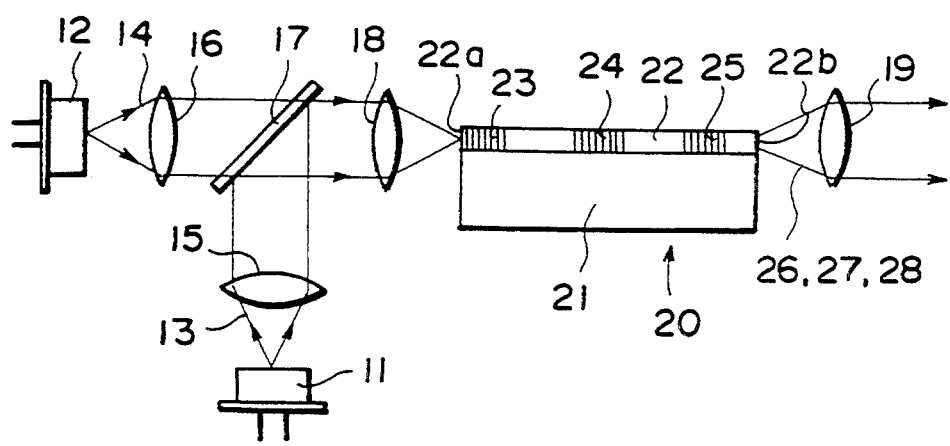
FIG. 1 is a side view showing a first embodiment of the optical wavelength converting apparatus in accordance with the present invention.

FIG. 1 shows a first embodiment of the optical wavelength converting apparatus in accordance with the present invention. In this embodiment, the optical wavelength converting apparatus comprises a first semiconductor laser 11, which serves as a fundamental wave source, a second semiconductor laser 12, which serves as a fundamental wave source, and an optical waveguide type of optical wavelength converting device 20.

Figure 2:
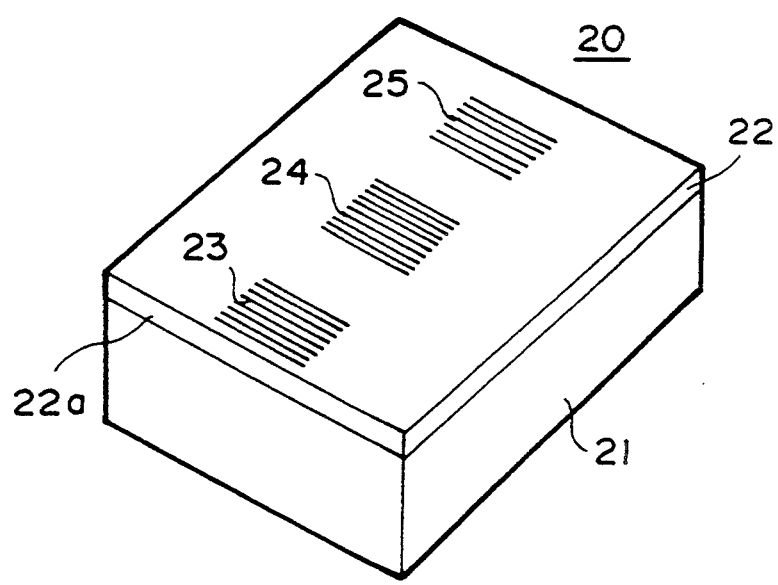
FIG. 2 is a perspective view showing an optical wavelength converting device employed in the first embodiment.

As illustrated also in FIG. 2, the optical wavelength converting device 20 comprises a substrate (hereinafter referred to as an LT substrate) 21, which is constituted of a crystal of LiTaO$_3$ serving as a nonlinear optical material, and a thin film optical waveguide 22. The optical waveguide 22 is provided with a first periodic domain-inverted structure 23, a second periodic domain-inverted structure 24, and the third periodic domain-inverted structure 25. By way of example, these periodic domain-inverted structures 23, 24, and 25 can be formed by subjecting the LT substrate 21 to a simple polarizing process, irradiating an electron beam to the LT substrate 21, for example, with an electron beam drawing apparatus, and thereby forming a predetermined periodic pattern on the LT substrate 21. In this embodiment, the thickness d of the optical waveguide 22 is 2.5 μm, the period Λ1 of the first periodic domain-inverted structure 23 is 12 μm, the period Λ2 of the second periodic domain-inverted structure 24 is 4.2 μm, and the period Λ3 of the third periodic domain-inverted structure 25 is 7.5 μm.

The first semiconductor laser 11 produces a laser beam 13 having a wavelength λ1 of 1,300 nm. The second semiconductor laser λ2 produces a laser beam 14 having a wavelength 12 of 900 nm. The laser beam 13 is collimated by a collimator lens 15 and is then reflected by a dichroic mirror 17. The laser beam 14 is collimated by a collimator lens 16 and then passes through the dichroic mirror 17. The laser beams 13 and 14, which have thus been combined with each other, are condensed by a condensing lens 18 such that they may be converged at an end face 22a of the optical waveguide 22. Thereafter, the laser beams 13 and 14 enter the optical waveguide 22 from the end face 22a.

The laser beams 13 and 14, which serve as fundamental waves and travel in the guided mode through the optical waveguide 22, are respectively converted by LiTaO$_3$ serving as the nonlinear optical material into second harmonics 26 and 27 having wavelengths equal to one half of the original wavelengths of the laser beams 13 and 14. Also, the laser beams 13 and 14 are converted into a wave 28 having a frequency equal to the sum of the frequencies of the laser beams 13 and 14. Specifically, in the first periodic domain-inverted structure 23, the so-called pseudo-phase matching is effected between the laser beam 13 having a wavelength λ1 of 1,300 nm and its second harmonic 26 (wavelength=650 nm). In the second periodic domain-inverted structure 24, the pseudo-phase matching is effected between the laser beam 14 having a wavelength λ2 of 900 nm and its second harmonic 27 (wavelength=450 nm). Also, in the third periodic domain-inverted structure 25, the pseudo-phase matching is effected between the two fundamental waves, i.e. the laser beams 13 and 14, and the wave 28, which has a frequency equal to the sum of the frequencies of the fundamental waves and which has a wavelength λ3 of 532 nm. The following formula obtains: $1/\lambda 3 = 1/\lambda 1 + 1/\lambda 2$.

As described above, in this embodiment, the second harmonic 26, which is red light having a wavelength of 650 nm, the second harmonic 27, which is blue light having a wavelength of 450 nm, and the wave 28, which has a frequency equal to the sum of the frequencies of the fundamental waves and which is green light having a wavelength of 532 nm, are obtained. The second harmonics 26 and 27 and the wave 28 having a frequency equal to the sum of the frequencies of the fundamental waves are radiated out of an end face 22b of the optical waveguide 22, collimated by a collimator lens 19, and then used for, for example, the recording of a color image.

The laser beams 13 and 14, which are radiated out of the optical wavelength converting device 20 together with the wavelength-converted waves 26, 27, and 28, can be separated from the wavelength-converted waves 26, 27, and 28 by using, e.g., a known dichroic mirror.

Figure 3:
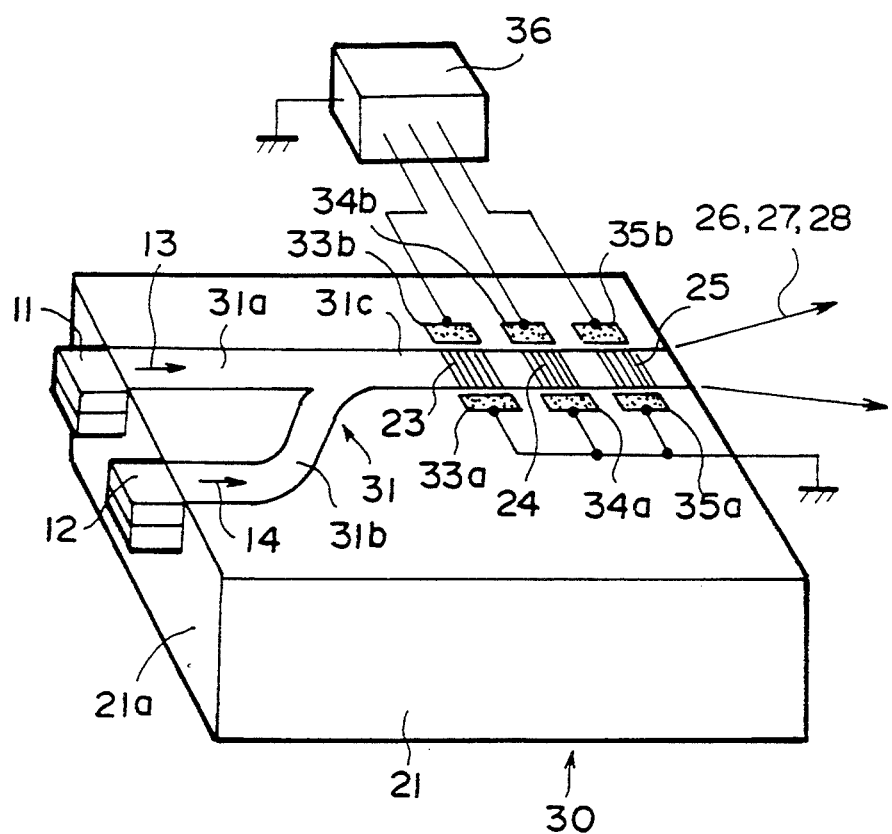
FIG. 3 is a perspective view showing a second embodiment of the optical wavelength converting apparatus in accordance with the present invention.

A second embodiment of the optical wavelength converting apparatus in accordance with the present invention will be described hereinbelow with reference to FIG. 3. In FIG. 3, similar elements are numbered with the same reference numerals with respect to FIGS. 1 and 2. (This also applies to the drawings that follow.)

In the second embodiment, the LT substrate 21 constituting an optical wavelength converting device 30 is provided with a Y-shaped channel optical waveguide 31. The first semiconductor laser 11 and the second semiconductor laser 12, which are in the chip state, are directly coupled with the substrate end face 21a so as to stand facing the end faces of two branch portions 31a and 31b of the channel optical waveguide 31. The laser beams 13 and 14, which have been produced by the semiconductor lasers 11 and 12, respectively impinge upon the branch portions 31a and 31b of the channel optical waveguide 31, travel through the branch portions 31a and 31b, and are then combined with each other.

A portion 31c of the channel optical waveguide 31, through which the combined laser beams 13 and 14 travel, is provided with the first periodic domain-inverted structure 23, the second periodic domain-inverted structure 24, and the third periodic domain-inverted structure 25, which are of the same types as those employed in the first embodiment. The periods of these periodic domain-inverted structures 23, 24, and 25, and the thickness of the optical waveguide 31 are identical with those in the first embodiment. The width of the optical waveguide 31 is 4 μm.

In the second embodiment, in the same manner as that in the first embodiment, the second harmonic 26, which is red light having a wavelength of 650 nm, the second harmonic 27, which is blue light having a wavelength of 450 nm, and the wave 28, which has a frequency equal to the sum of the frequencies of the fundamental waves and which is green light having a wavelength of 532 nm, are obtained. Additionally, in the second embodiment, the wavelength-converted waves 26, 27, and 28 can be modulated in the optical wavelength converting device 30. How they are modulated will be described hereinbelow.

A pair of electrodes 33a and 33b are located on the LT substrate 21 so as to sandwich the first periodic domain-inverted structure 23. A pair of electrodes 34a and 34b are located on the LT substrate 21 so as to sandwich the second periodic domain-inverted structure 24. Also, a pair of electrodes 35a and 35b are located on the LT substrate 21 so as to sandwich the third periodic domain-inverted structure 25. A modulation circuit 36 applies predetermined levels of voltage independently across the electrodes 33a and 33b, across the electrodes 34a and 34b, and across the electrodes 35a and 35b. For example, when the voltage is applied across the electrodes 33a and 33b, the refractive index of the voltage-applied portion of the optical waveguide 31 (i.e. the portion thereof provided with the first periodic domain-inverted structure 23) changes due to electrooptic effects. Therefore, it become impossible for the pseudo-phase matching to be effected by the first periodic domain-inverted structure 23. Accordingly, when the voltage is applied, the second harmonic 26 which is red light is non-existent.

The foregoing also applies to the second periodic domain-inverted structure 24 and the third periodic domain-inverted structure 25. When the voltage is applied across the electrodes 34a and 34b, the second harmonic 27 which is blue light is non-existent. When the voltage is applied across the electrodes 35a and 35b, the wave 28, which has a frequency equal to the sum of the frequencies of the fundamental waves and which is green light, non-existent. In this manner, with the second embodiment of the optical wavelength converting apparatus in accordance with the present invention, the respective wavelength-converted waves 26, 27 and 28 can be modulated Therefore, this embodiment can be utilized appropriately in a color image recording apparatus.

In the first and second embodiments described above, a plurality of wavelength-converted waves can be generated by a single optical wavelength converting device. Therefore, with the first and second embodiments, reflection of the fundamental waves or the wavelength-converted waves from the end faces of the optical wavelength converting device can be minimized, and the efficiency, with which the wavelength conversion is carried out, can thereby be kept higher than with a conventional optical wavelength converting apparatus, wherein a fundamental wave is caused to impinge upon one of a plurality of optical wavelength converting devices and then to impinge upon another optical wavelength converting device in order to obtain a plurality of wavelength-converted waves. For example, with the first embodiment, when each of the output power of the first semiconductor laser 11 and the output power of the second semiconductor laser 12 is 100 mW, the second harmonics 26 and 27 and the wave 28 having a frequency equal to the sum of the frequencies of the fundamental waves can be obtained which respectively have an intensity of approximately 1 mW.

Figure 5:
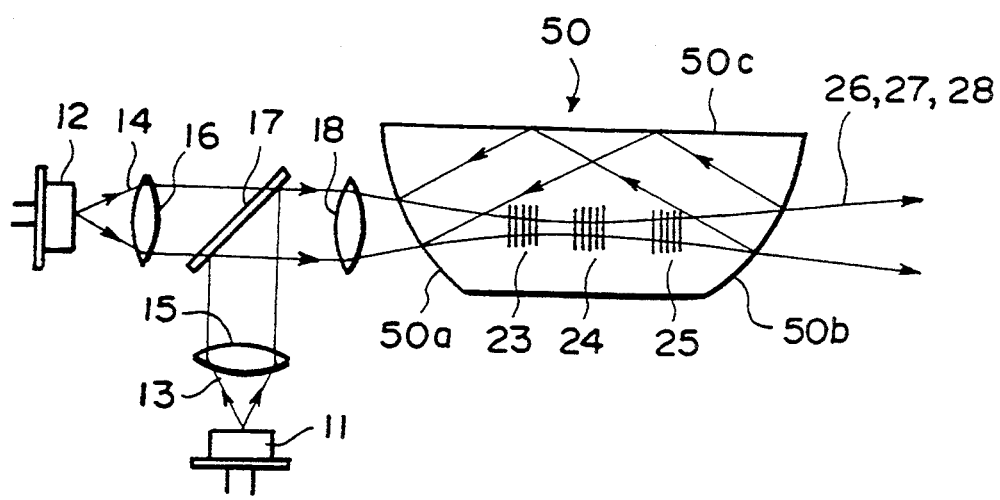
FIG. 5 is a side view showing a fourth embodiment of the optical wavelength converting apparatus in accordance with the present invention.

A fourth embodiment of the optical wavelength converting apparatus in accordance with the present invention will be described hereinbelow with reference to FIG. 5. The fourth embodiment differs from the first embodiment shown in FIG. 1 in that a bulk crystal type of optical wavelength converting device 50 is employed in lieu of the optical waveguide type of optical wavelength converting device 20. The optical wavelength converting device 50 is constituted of a crystal of Li-TaO₃ (LT), and has a length of 7 mm and a thickness of 3.5 mm.

Figure 6A:
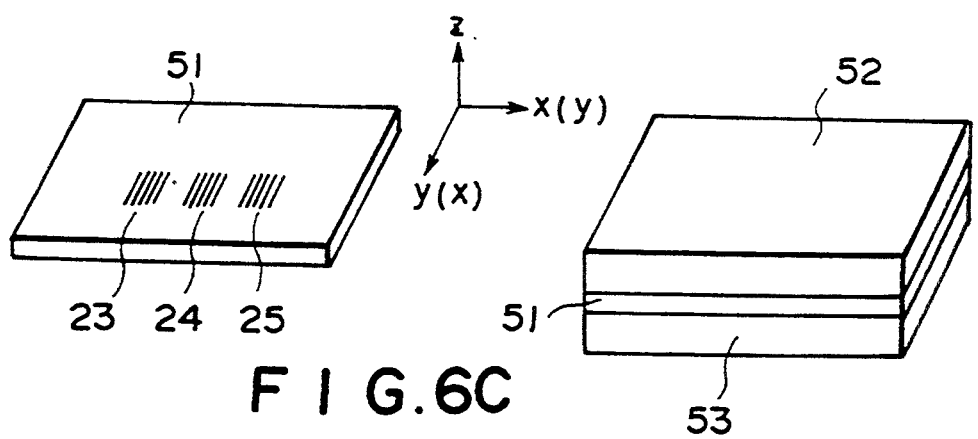

The optical wavelength converting device 50 is provided with the first periodic domain-inverted structure 23, the second periodic domain-inverted structure 24, and the third periodic domain-inverted structure 25. These periodic domain-inverted structures 23, 24, and 25 are of the same types as those in the first embodiment. Specifically, the period Λ1 of the first periodic domain-inverted structure 23 is 12 μm, the period Λ2 of the second periodic domain-inverted structure 24 is 4.2 μm, and the period Λ3 of the third periodic domain-inverted structure 25 is 7.5 μm. Particularly, in this embodiment, such that the optical wavelength converting device 50 may be constituted as a ring resonator for the fundamental waves, a light entry end face 50a and a light radiation end face 50b of the optical wavelength converting device 50 are polished into circular arc-like surfaces having a radius of curvature of 5 mm. Also, a side end face 50c of the optical wavelength converting device 50 are polished into a flat surface By way of example, the optical wavelength converting device 50 can be prepared in the manner described below. As illustrated in FIG. 6A, an LT single crystal substrate (a z-plate) 51, which has a thickness of 0.5 mm and which has been subjected to a simple polarizing process, is prepared. An electron beam is then irradiated to the LT substrate 51 in an electron beam drawing apparatus, and a predetermined periodic pattern is thereby drawn on the LT substrate 51. In this manner, the periodic domain-inverted structures 23, 24, and 25 are formed. Thereafter, as illustrated in FIG. 6B, in order to facilitate the end face polishing process, which will be described later, LT substrates 52 and 53 having a thickness of 2 mm are respectively adhered to the front and back surfaces of the LT substrate 51. The end faces 50a and 50b and the end face 50c are polished into the shapes described above. Also, the end faces 50a and 50b are provided with coating layers, which have the characteristics shown below with respect to light having wavelengths of 1,300 nm, 900 nm, 650 nm, 450 nm, and 532 nm. In this manner, the optical wavelength converting device 50 is obtained.

|  | 1,300 nm | 900 nm | 650 nm | 450 nm | 532 nm |
|---|---|---|---|---|---|
| End face 50a | 90% reflection | 90% reflection | — | — | — |
| End face 50b | 99.9% reflection | 99.9% reflection | 90% transmission | 90% transmission | 90% transmission |

In the same manner as that in the first embodiment, the first semiconductor laser 11 produces the laser beam 13 having a wavelength λ1 of 1,300 nm, and the second semiconductor laser 12 produces the laser beam 14 having a wavelength λ2 of 900 nm. The laser beams 13 and 14, which have been combined with each other by the dichroic mirror 17, are condensed by the condensing lens 18 such that they may converge in the LT substrate 51. The laser beams 13 and 14 then enter the optical wavelength converting device 50 from the end face 50a. At this time, in order to utilize a large nonlinear optical constant d33 of LT, the directions of linear polarization of the laser beams 13 and 14 are matched with the z axis direction of the LT substrate 51.

The laser beams 13 and 14, which have entered the optical wavelength converting device 50, are sequentially reflected by the end faces 50b, 50c, and 50a of the device 50 and follow a ring-like optical path. The intensities of the laser beams 13 and 14 thus become high through the resonation, and thereafter the laser beams 13 and 14 pass through the periodic domain-inverted structures 23, 24, and 25. The phase matching is thereby effected in the same manner as that in the first embodiment. In this manner, the second harmonic 26 (wavelength=650 nm) of the laser beam 13, the second harmonic 27 (wavelength=450 nm) of the laser beam 14, and the wave 28 (wavelength=532 nm), which has a frequency equal to the sum of the frequencies of the laser beams 13 and 14, are obtained. The directions of linear polarization of the second harmonic 26, the second harmonic 27, and the wave 28 having a frequency equal to the sum of the frequencies of the fundamental waves, which have thus been obtained, coincide with the z axis direction of the LT substrate 51. Most portions (90%) of the second harmonic 26, the second harmonic 27, and the wave 28 having a frequency equal to the sum of the frequencies of the fundamental waves pass through the end face 50b and are radiated out of the optical wavelength converting device 50.

In the fourth embodiment described above, a plurality of wavelength-converted waves can be generated by a single optical wavelength converting device 50. Therefore, with the fourth embodiment, reflection of the fundamental waves or the wavelength-converted waves from the end faces of the optical wavelength converting device can be minimized, and the efficiency, with which the wavelength conversion is carried out, can thereby be kept higher than with a conventional optical wavelength converting apparatus, wherein a fundamental wave is caused to impinge upon one of a plurality of optical wavelength converting devices and then to impinge upon another optical wavelength converting device in order to obtain a plurality of wavelength-converted waves. In particular, with the fourth embodiment, the laser beams 13 and 14 serving as the fundamental waves are resonated so as to have a high intensity and are then passed through the periodic domain-inverted structures 23, 24, and 25. Therefore, the efficiency, with which the wavelength conversion is carried out, can be kept particularly high. For example, with the fourth embodiment, when each of the output power of the first semiconductor laser 11 and the output power of the second semiconductor laser 12 is 200 mW, the second harmonics 26, which has an intensity of approximately 40 mW, the second harmonic 27, which has an intensity of approximately 60 mW, and the wave 28, which has a frequency equal to the sum of the frequencies of the fundamental waves and which has an intensity of approximately 50 mW, can be obtained.

As described above, the optical wavelength converting device 50 constitutes the ring resonator. In the ring resonator, reverse-turn ring light occurs due to reflection from the periodic domain-inverted structures 23, 24, and 25, and the like. The reverse-turn ring light returns to the semiconductor lasers 11 and 12. Therefore, the so-called light feedback is effected, and the oscillation frequencies are locked such that they may coincide with the resonance frequency (wavelength) of the ring resonator.

Figure 6C:
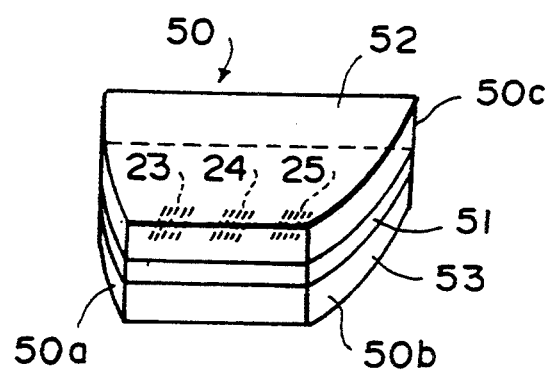
Figure 7A:
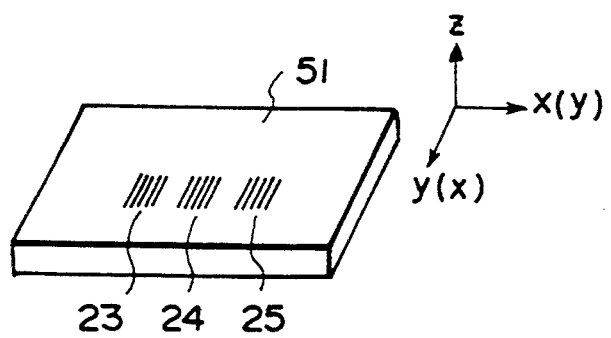
FIGS. 7A and 7B are explanatory views showing a different example of how the bulk crystal type of optical wavelength converting device is prepared.
Figure 7B:
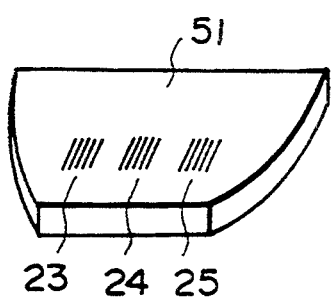

The bulk crystal type of optical wavelength converting device as described above can also be prepared with a method other than that shown in FIGS. 6A, 6B, and 6C. For example, as illustrated in FIG. 7A, in the same manner as that described above, the periodic domain-inverted structures 23, 24, and 25 may be formed on an slightly thick LT substrate 51 having a slightly large thickness of, e.g., approximately 1 mm. Thereafter, as illustrated in FIG. 7B, the end faces of the LT substrate 51 may be directly polished in order to obtain an optical wavelength converting device.

Figure 8:
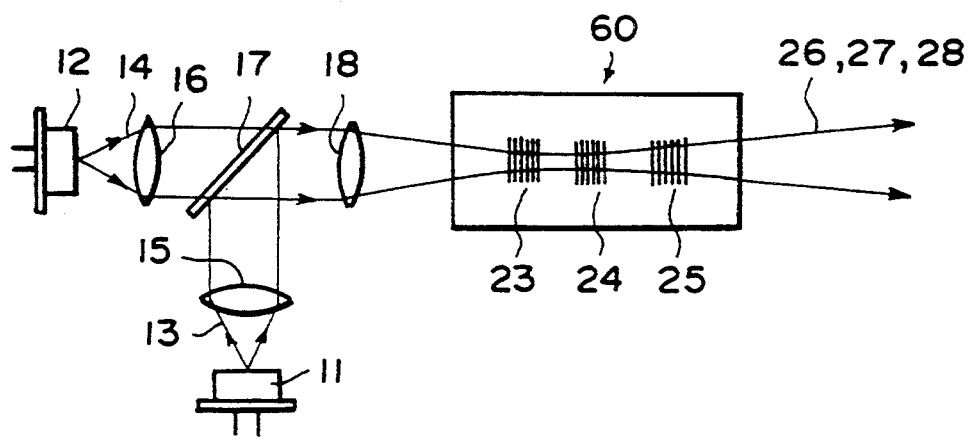
FIG. 8 is a side view showing a fifth embodiment of the optical wavelength converting apparatus in accordance with the present invention.

A fifth embodiment of the optical wavelength converting apparatus in accordance with the present invention will be described hereinbelow with reference to FIG. 8. The fifth embodiment differs from the fourth embodiment of FIG. 5 in that a bulk crystal type of optical wavelength converting device 60 is not provided with the function of an external resonator for fundamental waves. Specifically, the optical wavelength converting device 60 is prepared with the processes shown in FIGS. 6A and 6B or with the process shown in FIG. 7A.

Therefore, in the fifth embodiment, basically, the laser beams 13 and 14 serving as the fundamental waves pass only once through the periodic domain-inverted structures 23, 24, and 25. With this configuration, for example, when each of the output power of the first semiconductor laser 11 and the output power of the second semiconductor laser 12 is 1 mW, the second harmonics 26, which has an intensity of approximately 13 mW, the second harmonic 27, which has an intensity of approximately 20 mW, and the wave 28, which has a frequency equal to the sum of the frequencies of the fundamental waves and which has an intensity of approximately 18 mW, can be obtained.

Figure 4:
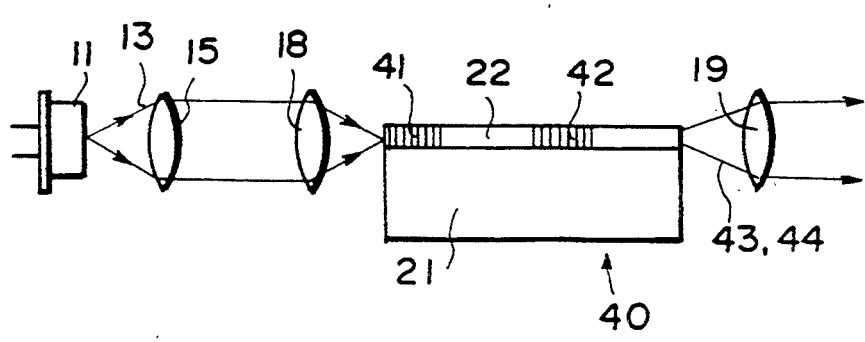
FIG. 4 is a side view showing a third embodiment of the optical wavelength converting apparatus in accordance with the present invention.

In the optical wavelength converting apparatus of the present invention, the number of the fundamental wave sources and the number of the periodic domain-inverted structures are not limited to those in the aforesaid embodiments. For example, in a third embodiment shown in FIG. 4, only a single first semiconductor laser 11 is provided as the fundamental wave source, and two periodic domain-inverted structures 41 and 42 are formed in the optical waveguide 22 of an optical wavelength converting device 40. In such cases, the first periodic domain-inverted structure 41 has a period such that the phase matching between the laser beam 13 serving as the fundamental wave and its second harmonic 43 may be effected. Also, the second periodic domain-inverted structure 42 has a period such that the phase matching between the laser beam 13 and its third harmonic 44 may be effected.

Also, in cases where only a single fundamental wave source is provided as in the third embodiment, reflection of the fundamental wave or the wavelength-converted waves from the end faces of the optical wavelength converting device can be minimized, and the efficiency, with which the wavelength conversion is carried out, can thereby be kept higher than with a conventional optical wavelength converting apparatus, wherein a fundamental wave is caused to impinge upon one of a plurality of optical wavelength converting devices and then to impinge upon another optical wavelength converting device in order to obtain a plurality of wavelength-converted waves.

The nonlinear optical material employed in the present invention is not limited to LT, and may be selected from other materials, e.g. $LiNbO_3$ (LN), MgO-Lt, MgO-LN, $KNbO_3$, KTP, BBO, and LBO. Also, in cases where the bulk crystal type of optical wavelength converting device is prepared in the manner described above with reference to FIGS. 6A, 6B, and 6C, the materials of the members adhered to the front and back surfaces of the nonlinear optical material need not necessarily be identical with the nonlinear optical material. For example, in the fourth embodiment, glass and LN substrates, and the like, may be adhered respectively to the front and back surfaces of the LT substrate 51.

What is claimed is:

1. An optical wavelength converting apparatus comprising:
   i) a wave source comprising a first fundamental wave source, for producing a first laser beam, and a second fundamental wave source, for producing a second laser beam having a wavelength different from a wavelength of the first laser beam, the first and second laser beams cooperating to produce a laser beam serving as a fundamental wave; and
   ii) an optical wavelength converting device, comprising a nonlinear optical material optical waveguide for converting a wavelength of the laser beam impinging upon and guided through the optical waveguide, the optical waveguide comprising:
- a first periodic domain-inverted structure, for effecting phase matching between the first laser beam and a second harmonic thereof;
- a second periodic domain-inverted structure, for effecting phase matching between the second laser beam and a second harmonic thereof; and
- a third periodic domain-inverted structure, for effecting phase matching between the first laser beam and the second laser beam and a wave having a frequency equal to the sum of frequencies of the first laser beam and the second laser beam.

2. An apparatus as defined in claim 1, wherein said fundamental wave source is a semiconductor laser.

3. An apparatus as defined in claim 1, wherein said optical waveguide is a thin film optical waveguide.

4. An apparatus as defined in claim 1, wherein said optical waveguide is a channel optical waveguide.

5. An apparatus as defined in claim 1, wherein said nonlinear optical material is $LiTaO_3$.

6. An apparatus as defined in claim 1, wherein said wave source and said optical wavelength converting device are located such that they may be in close contact with each other.

7. An optical wavelength converting apparatus comprising:
   i) a wave source comprising a first fundamental wave source for producing a first laser beam, and a second fundamental wave source for producing a second laser beam having a wavelength different from a wavelength of the first laser beam, the first and second laser beams cooperating to produce a laser beam serving as a fundamental wave; and
   ii) an optical wavelength converting device, comprising a nonlinear optical material bulk crystal, for converting a wavelength of the laser beam impinging upon and guided through the optical wavelength converting device, the optical wavelength converting device comprising:
   - a first periodic domain-inverted structure, for effecting phase matching between the first laser beam and a second harmonic thereof;
   - a second periodic domain-inverted structure, for effecting phase matching between the second laser beam and a second harmonic thereof; and
   - a third periodic domain-inverted structure, for effecting phase matching between the first laser beam and the second laser beam and a wave having a frequency equal to the sum of frequencies of the first laser beam and the second laser beam.

8. An optical wavelength converting apparatus comprising:
- a fundamental wave source for producing a laser beam serving as a fundamental wave; and
   ii) an optical wavelength converting device, comprising a nonlinear optical material bulk crystal, for converting a wavelength of the laser beam impinging upon the bulk crystal,
   the bulk crystal resonating the laser beam and comprising a plurality of periodic domain-inverted structures for effecting phase matching between the laser beam and wavelength-converted waves.

9. An apparatus as defined in claim 8, wherein said fundamental wave source is a semiconductor laser.

10. An apparatus as defined in claim 8 wherein a first fundamental wave source, which produces a first laser beam, and a second fundamental wave source, which produces a second laser beam having a wavelength different from a wavelength of the first laser beam, are provided as the fundamental wave source, and
   said periodic domain-inverted structures comprise a first periodic domain-inverted structure, which effects phase matching between the first laser beam and a second harmonic thereof, a second periodic domain-inverted structure, which effects phase matching between the second laser beam and a second harmonic thereof, and a third periodic domain-inverted structure, which effects phase matching between the first laser beam and the second laser beam and a wave having a frequency equal to the sum of frequencies of the first laser beam and the second laser beam.

11. An apparatus as defined in claim 8, wherein said nonlinear optical material is $LiTaO_3$.

12. An optical wavelength converting apparatus comprising:
- a fundamental wave source for producing a laser beam serving as a fundamental wave; and
- an optical wavelength converting device, comprising a nonlinear optical material channel optical waveguide having first and second channel portions, for converting a wavelength of the laser beam impinging upon and guided through the optical waveguide, the optical waveguide comprising at least one periodic domain-inverted structure for effecting phase matching between the laser beam and wavelength-converted waves; and
- means for changing a refractive index of the at least one periodic domain-inverted structure.

13. An apparatus as claimed in claim 12, wherein the wave source comprises a first fundamental wave source for producing a first laser beam, and a second fundamental wave source for producing a second laser beam having a wavelength different from the wavelength of the first laser beam, the first and second laser beams being input in said first and second channel portions, respectively, and cooperating to produce the laser beam serving as the fundamental wave.

14. An apparatus as defined in claim 12, wherein the optical wavelength converting device comprises a plurality of said periodic domain-inverted structures.

* * * * *